Jan. 29, 1952     C. E. SLAUGHTER     2,584,095
TUBULAR CONTAINER
Filed June 13, 1946
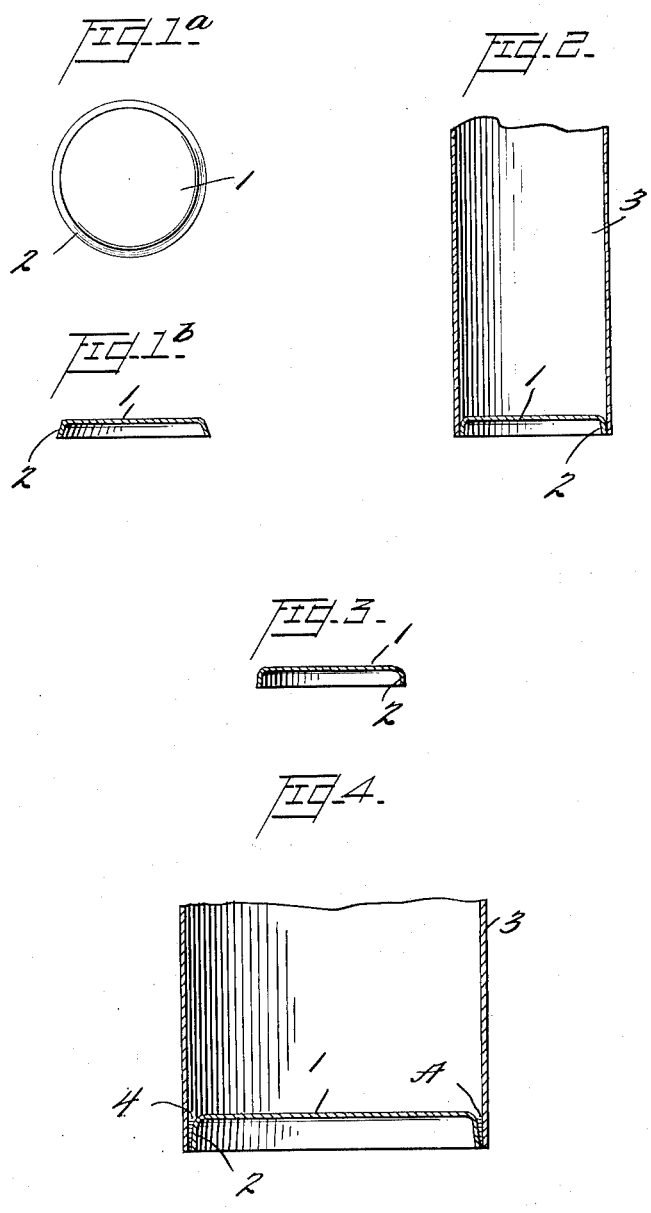
Inventor
Charles E. Slaughter,
By Sol Shappirio
Attorney Patented Jan. 29, 1952

2,584,095

UNITED STATES PATENT OFFICE 2,584,095

TUBULAR CONTAINER

Charles E. Slaughter, New Canaan, Conn., assignor to Extruded Plastics, Inc., Norwalk, Conn., a corporation of Connecticut Application June 13, 1946, Serial No. 676,493

2 Claims. (Cl. 229—5.5)

This invention relates to tubular containers and more particularly to such containers produced from thermoplastic tubing with closures applied to one or both ends of a discrete length of such tubing, to methods of producing such containers and to elements utilized in their production.

There are two general methods of closing the end of a plastic tube which have been used in the prior art, but both have proved thoroughly unsatisfactory. The first method is to cement a disc of the plastic to the end of the tube. This disc is either die-stamped to the exact size or made oversize and after being cemented in place, the surplus material is trimmed off. There are many objections to this method. First of all, tubing is not always exactly the same size nor is it ever exactly round within less than one thousandth of an inch, which means that there will often be a small lip left on the edge of the cap which must be trimmed off at great expense. Because pressure is essential to obtain a true bond, it is necessary to hold each individual piece of tubing in close contact with the disc for a matter of several seconds while the solvent is surface drying. Still another serious objection is that the area for bonding, especially on thin walled tubing as generally used, is so small that it is impossible to obtain a joint that will stand up. Any slight pressure on the wall of the tube will cause the bond to break and the end will then drop off.

The other usual method is to insert a heavy disc of material either stamped from heavy sheet stock or machined from a solid rod. This method is also disadvantageous. It is impossible as pointed out above, to hold the tubing to zero tolerance. The result is that if the plug is the exact theoretical size, it may be slightly too large or slightly too small by a few thousandths of an inch for the "run of the mill" tubing. If too large, it will expand the tube and form an unpleasant looking bulge. Further, inserting it when the fit is slightly on the tight side, wipes off cement applied to the surface and poor quality joint is obtained. If the plug is slightly too small, the cement will not form a good joint, as for some reason, it is not possible to obtain a first class joint with the cellulosic type resins unless some slight pressure is applied during the drying process.

Among the objects of the present invention is the production of tubular containers from thermoplastic tubing by applying disc-like closures to one or both ends of such tubing by methods which are relatively simple and inexpensive and produce satisfactory joints.

Other objects include the production of containers of satisfactory sealed character and elements utilizable in producing such containers.

Further objects and advantages of the present invention will appear from the more detailed description set forth below, it being understood that this more detailed description is given by way of illustration and explanation only, and not by way of limitation, since various changes therein may be made by those skilled in the art without departing from the scope and spirit of the present invention.

In accordance with that more detailed description, there is shown in the accompanying drawing, in Figure 1a and b, a top plan view and a transverse cross-section, respectively, through a disc-like closure utilized in accordance with the present invention; in Figure 2, a transverse section through a length of tubing with the disc of Figure 1 inserted in position; in Figure 3, a transverse section through the disc when positioned as shown in Figure 2; and in Figure 4, the tube and disc of Figure 2 with capillarity positioned cement.

In accordance with the present invention, tubular containers from thermoplastic materials are produced by sealing one or both ends of a thermoplastic tube which may be a discrete length of extruded tubing produced by any of the available extrusion methods from extrudable thermoplastic materials. The tube is sealed at one or both ends by applying thereto a disc-like closure desirably of the same type of thermoplastic material from which the tube itself has been extruded. The disc-like closure is desirably in the form of a flexible thermoplastic disc, having a peripheral flange, which tapers outwardly from the disc itself in what in cross-section may be described as a "U-shaped disc." Desirably the disc-like closure provided with peripheral flange is die-stamped out from thermoplastic sheet stock of the desired type and the tapering flange which is provided is made so that the area of the disc-like closure is smaller than the internal cross-sectional area of the tube with which it is to be employed, while the outer edge of the tapering flange portion encompasses an area larger than the internal cross-sectional area of the tube. These dimensions are desirably employed taking "run of the mill" tolerances for the tubing. It is a simple matter to stamp out the U-shaped disc and insert it within the tube where it holds sufficiently by spring action, particularly where the disc material is made from fairly flexible thin sheet stock. The preferred form of closure employed is illustrated in Figure 1 of the drawing where the flexible thermoplastic sheet disc 1, carries the peripheral flange 2, which tapers outwardly to a degree with respect to the tube with which it is to be employed that the top of the taper is slightly smaller than the internal diameter of the tube while the outer edges are larger than the maximum size of the internal diameter of the tube again referring to "run of the mill" tolerances.

The peripheral flange disc is so designed that when it is inserted within the tube the tapered flange, as shown in Figure 1, is bent over as shown in Figure 3, to form an almost parallel wall with the tube. The U-shaped disc may be designed to give a narrow taper after insertion in the tube to control the overall width of the seal by capillary action. Disc-like closures of the type referred to above may then be utilized in various ways. As pointed out, the disc-like closure as shown in Figure 1, exhibits sufficient spring action so that when inserted within the end of the tube 3, Figure 2, there is sufficient spring action to hold the disc in place as illustrated in Figure 2. But of even greater importance is the fact that this spring action generates sufficient pressure to make a first class welded joint. Slight though sufficient pressure thus exerted by this flange causes a true weld when a suitable solvent cement is applied. The tube utilized is a discrete length of thermoplastic tubing, desirably produced by extrusion, and desirably is of the same thermoplastic material as the disc-like closure employed.

In a method of making containers following this invention, reference may be made to Figures 2 to 4. As shown in Figure 2, the tube 3 is brought adjacent the closure 1 and the closure 1 inserted in the end of the tube 3 as shown in Figure 2. At this point no cement or solvent has been applied but the spring action of the flexible disc will hold it in position as shown in Figure 3, and that spring action is sufficient to give the necessary pressure to secure the ultimate welding effect. The tube 3 carrying the disc 1 in position as shown in Figure 2 is then brought into contact in any desirable way with a solvent for the thermoplastic employed. This is readily done by placing the tube 3 carrying the disc 1 as shown in Figure 2 in contact with a rubber disc covered by a thin layer of a suitable solvent of the particular thermoplastic. This thin layer may be only a few thousandths of an inch deep, although any desired depth, for example .030 inch, may be used. In contact with such thin layer of solvent, capillary attraction causes the solvent 4 to climb within the tube and between the tube and the disc. The height of climb of the solvent may vary slightly from tube to tube depending upon the clearance at point A which is, of course, dependent upon any slight variation in the diameter of the tube as compared to the fixed diameter of the stamped disc beneath the flange. Figure 4 illustrates how capillary action results in application of the solvent cement on a wide bearing surface with no wetting by solvent on the outside of the tube. By the utilization of capillarity to position the solvent, a completely uniform ring of solvent is adsorbed and positioned and a perfect cementing job is obtained without difficulty. The limitation of the position of the solvent by capillarity avoids any undesirable effect of the solvent biting into the outer portion of the thermoplastic of the tube, and a smooth uniform satisfactory joint is produced.

Various types of thermoplastic materials may be utilized, particularly thermoplastic synthetic resinous materials including cellulose derivatives such as the esters and ethers, for example, cellulose acetate, cellulose nitrate, cellulose acetate butyrate, ethyl cellulose, benzyl cellulose, etc.; vinyl polymers and copolymers including polymerized vinyl acetate, polymerized vinylidene chloride, and copolymers of vinyl chloride and vinyl acetate; polymerized styrenes, methacrylate and methyl methacrylate resins; polyethylenes, nylon type resins, etc.

The solvent employed necessarily depends on the type of thermoplastic which is utilized. For example, for cellulose acetate, the solvent utilized may be acetone or glycol ethers or mixtures thereof. For ethyl cellulose, the solvent employed may be toluene. In lieu of solvents, cements which will serve to cause adherence of the thermoplastic disc to the tube may be employed of any desirable character although solvents are desirably utilized. Other methods of sealing the disc closure to the tube end may be employed, as for example, heat which may be developed electronically or otherwise. But the application of solvent by capillarity as indicated above gives an excellent seal. In this way a tubular container is produced from a thermoplastic tube by means of a disc-like closure provided with a peripheral flange, the flange being sealed to the wall of the tube adjacent thereto. For example, such tube made from cellulose acetate with a wall thickness and a flange thickness of .020 inch have been tested by heating in boiling water. The temperature was such that the plastic was materially softened and by applying air pressure the tube and sealed-in end bulged out approximately 50% more than its original diameter without showing any breakdown at the weld.

Another method which may be utilized but not as desirably as that set forth above, is to produce a disc-like closure of the character set forth in Figure 1 and apply cement or solvent to the end of the tube and the latter then forced by light pressure onto the tapered stamped disc-like closure. There is sufficient "spring" in the plastic to take up variation in the internal dimensions of the tube and at the same time by exerting sufficient pressure against the tube due to such spring action, to form a good welded joint.

Or another method which may be employed is to take the tube and wet the end by a solvent such as acetone depending on the thermoplastic employed, to punch out a closure by a die punching operation, such closure of the character set forth above and described in connection with Figure 1, and at the time of such punching out operation to apply the closure by insertion into the end of the tube wet with acetone. It is then desirable to dip the assembly in acetone again and dry. It may be necessary to hold the disc in place in the tube end for a varying short time period, as from 5 to 20 seconds, until the sealing has taken place. While this method may be employed for producing a tubular container from thermoplastic tubing and disc-like closures, it is not as desirable as the first method described above because the dipping of the end of the tube in solvent or cement tends to bite into the outer surface of the tube and produces some shrinkage and weakness, possibly due to extraction of plasticizers. Also upon insertion of the U-shaped disc an uneven layer of solvent may be formed between the tube and the disc with the result that the tube is not sealed uniformly around the whole periphery. The method of placing the solvent or cement in position by capillary attraction is, therefore, superior to those methods which involve direct application of the solvent or cement to the tube end.

In connection with any of the thermoplastic materials described above, the thermoplastic may be dyed or pigmented in any desired way to produce any desired color, and if desired the closures may be made contrasting in color with the tube from which the container stock is produced. While oval shaped discs and disc-like closures are illustrated for use in connection with tubing of oval cross-section, the tubing used for producing the tubular containers may be of any desired cross-sectional configuration including round tubing, hexagonal tubing, square tubing, etc. In such cases, of course, the closure will be made of a contour to fit the particular type of tubing utilized in the fabrication of the containers.

Having thus set forth my invention, I claim:

1. A tubular container comprising a self-supporting tube made from flexible thermoplastic said tube having straight side walls and having its end closed by a disc-like closure made of flexible thermoplastic and provided with a peripheral flange fitting within said tube, the disc-like portion of the closure being smaller than the internal cross-sectional area of the tube, the flange tapering outwardly from the disc-like portion, the outer peripheral edge only of the tapering wall of the flange exerting pressure against the inner wall of the tube and providing a capillary space between the remainder of the flange and the inner wall of the tube in which capillary space a sealing composition is limited to seal the flange to the wall of the tube contiguous thereto.

2. The method of sealing the end of thermoplastic tube to produce a container therefrom which comprises inserting a disc-like closure made of flexible thermoplastic into the end of a self-supporting tube made of flexible thermoplastic, said tube having straight side walls, said closure having a peripheral flange fitting within the tube, the disc-like portion of the closure being smaller than the internal cross-sectional area of the tube, the flange tapering outwardly from the disc-like portion, the outer peripheral edge only of the tapering wall of the flange exerting pressure against the inner wall of the tube and providing a capillary space between the remainder of the flange and the inner wall of the tube, placing the end of the tube carrying the inserted closure on a layer of sealing composition for the thermoplastic the depth of the layer being less than the height of the flange whereby the sealing composition rises by capillarity between the flange of the closure and the inner wall of the tube, removing the tube from the said layer, and drying the treated plastic, whereby a sealed tubular container is obtained with the sealing composition limited in position to the capillary space between the flange and the wall of the tube.

CHARLES E. SLAUGHTER.

REFERENCES CITED

The following references are of record in the file of this patent:

UNITED STATES PATENTS

| Number | Name | Date |
|---|---|---|
| 547,956 | Klein | Oct. 15, 1895 |
| 1,415,100 | Lang | May 9, 1922 |
| 1,488,634 | Dunham | Apr. 1, 1924 |
| 1,510,243 | Perry | Sept. 30, 1924 |
| 1,625,907 | Peterson | Apr. 26, 1927 |
| 1,970,775 | Knoll | Aug. 21, 1934 |
| 2,133,629 | Meyer | Oct. 18, 1938 |
| 2,259,256 | Maas et al. | Oct. 14, 1941 |
| 2,285,220 | Morrell | June 2, 1942 |
| 2,348,696 | Schabacker | May 9, 1944 |
| 2,383,230 | Voke | Aug. 21, 1945 |
| 2,393,347 | Stuart et al. | Jan. 22, 1946 |

FOREIGN PATENTS

| Number | Country | Date |
|---|---|---|
| 573,737 | Great Britain | Dec. 4, 1945 |